United States Patent
Baker

(10) Patent No.: US 9,292,747 B2
(45) Date of Patent: Mar. 22, 2016

(54) METHODS AND SYSTEMS FOR AUTOMATIC AND SEMI-AUTOMATIC GEOMETRIC AND GEOGRAPHIC FEATURE EXTRACTION

(71) Applicant: The Boeing Company, Seal Beach, CA (US)

(72) Inventor: Anthony Wayne Baker, Gilbertsville, PA (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 13/839,799

(22) Filed: Mar. 15, 2013

(65) Prior Publication Data

US 2014/0270359 A1  Sep. 18, 2014

(51) Int. Cl.
G06K 9/00 (2006.01)

(52) U.S. Cl.
CPC .................................. *G06K 9/0063* (2013.01)

(58) Field of Classification Search
None
See application file for complete search history.

(56) References Cited

U.S. PATENT DOCUMENTS

| | | | | |
|---|---|---|---|---|
| 5,046,119 A * | 9/1991 | Hoffert | ........... | G06T 9/005 358/524 |
| 6,160,902 A * | 12/2000 | Dickson | ........... | G01J 3/2803 348/144 |
| 6,539,126 B1 * | 3/2003 | Socolinsky | ........... | G06T 5/50 345/617 |
| 6,567,537 B1 * | 5/2003 | Anderson | ........... | G06K 9/00657 382/110 |
| 8,731,305 B1 * | 5/2014 | Mantri | ........... | G06K 9/6206 382/181 |
| 2001/0016053 A1 * | 8/2001 | Dickson | ........... | G01J 3/2803 382/110 |
| 2003/0108237 A1 * | 6/2003 | Hirata | ........... | G06F 17/3025 382/164 |

(Continued)

FOREIGN PATENT DOCUMENTS

| | | |
|---|---|---|
| CN | 102054274 A | 5/2011 |
| JP | 2013171335 A | 9/2013 |

(Continued)

OTHER PUBLICATIONS

"Proceedings of the 1999 IEEE Computer Society Conference on Computer Vision and Pattern Recognition," pp. 319-325, vol. 1, Socolinsky D A, "A new visualization paradigm for multispectral imagery and data fusion".

(Continued)

*Primary Examiner* — Jayesh A Patel
*Assistant Examiner* — Iman K Kholdebarin
(74) *Attorney, Agent, or Firm* — Armstrong Teasdale LLP

(57) ABSTRACT

Methods and systems for facilitating detecting features in sensor data are described. One example method implemented by a computing device includes receiving a first set of sensor data about a geographical region, and generating a second set of sensor data. The first set of sensor data includes data in a plurality of bands. The second set of sensor data is generated by receiving a first input designating a first sub-region of the geographical region, and determining a single band representation of at least a portion of the first set of sensor data associated with the first sub-region.

14 Claims, 6 Drawing Sheets

(56) References Cited

U.S. PATENT DOCUMENTS

| | | | | |
|---|---|---|---|---|
| 2004/0008381 | A1* | 1/2004 | Jacob | H04N 1/40012 358/2.1 |
| 2004/0263514 | A1* | 12/2004 | Jin | G06K 9/0063 345/440 |
| 2005/0201597 | A1* | 9/2005 | Wendt | G06K 9/0008 382/125 |
| 2007/0031042 | A1* | 2/2007 | Simental | G06K 9/527 382/191 |
| 2008/0144013 | A1* | 6/2008 | Lanoue | G01J 3/02 356/73 |
| 2009/0022359 | A1* | 1/2009 | Kang | G06K 9/00657 382/100 |
| 2009/0123070 | A1* | 5/2009 | Xiaoying | G06T 7/0081 382/176 |
| 2009/0271719 | A1* | 10/2009 | Clare | G08B 29/007 715/762 |
| 2012/0155714 | A1* | 6/2012 | Douglass | G06K 9/2018 382/110 |
| 2012/0330722 | A1* | 12/2012 | Volpe | G06Q 30/0201 705/7.32 |
| 2013/0039574 | A1* | 2/2013 | McKay | G06K 9/0063 382/167 |
| 2013/0163822 | A1* | 6/2013 | Chigos | G06K 9/00771 382/105 |

FOREIGN PATENT DOCUMENTS

| | | |
|---|---|---|
| WO | 2010144713 A2 | 12/2010 |
| WO | 2011021012 A1 | 2/2011 |

OTHER PUBLICATIONS

UK Search and Examination Report in Application No. GB1403355.9 mailed Sep. 1, 2014.

* cited by examiner

METHODS AND SYSTEMS FOR AUTOMATIC AND SEMI-AUTOMATIC GEOMETRIC AND GEOGRAPHIC FEATURE EXTRACTION

BACKGROUND

The field of the disclosure relates generally to extraction of features from data, and more specifically, to automatic and semi-automatic geographic and geometric feature extraction.

Feature extraction and content generation from sensor data, and more particularly from image data, is important for simulation and geospatial analysis. In some known systems, a user typically reviews an image to identify features such as buildings, roads, water ways, coastlines, etc. and label. The user then digitizes the boundaries of each feature and labels the feature as a building, a roadway, etc. The users of such known systems are typically skilled analysts who spend around ten seconds to digitize the boundary of a single building in an image. Accordingly, the use of known systems for feature extraction are often time consuming and limited by the skills of the human user.

BRIEF DESCRIPTION

In one aspect, a method implemented by a computing device includes receiving a first set of sensor data about a geographical region, and generating a second set of sensor data. The first set of sensor data includes data in a plurality of bands. The second set of sensor data is generated by receiving a first input designating a first sub-region of the geographical region, and determining a single band representation of at least a portion of the first set of sensor data associated with the first sub-region.

In another aspect of the present disclosure, a computing device for facilitating detecting features in sensor data is described. The computing device includes a processor and a memory coupled to the processor. The memory includes computer-executable instructions that, when executed by the processor, cause the computing device to: receive a first set of sensor data about a geographical region, and generate a second set of sensor data. The first set of sensor data includes data in a plurality of bands. The second set of sensor data is generated by: receiving a first input designating a first sub-region of the geographical region, and determining a single band representation of at least a portion of the first set of sensor data associated with the first sub-region.

Another aspect of the present disclosure is a computer-readable storage device having computer-executable instructions embodied thereon. When executed by a computing device including a processor and a memory coupled to the processor, the computer-executable instructions cause the computing device to: receive a first set of sensor data about a geographical region, and generate a second set of sensor data. The first set of sensor data includes data in a plurality of bands. The second set of sensor data is generated by: receiving a first input designating a first sub-region of the geographical region, and determining a single band representation of at least a portion of the first set of sensor data associated with the first sub-region.

The features, functions, and advantages that have been discussed can be achieved independently in various embodiments or may be combined in yet other embodiments further details of which can be seen with reference to the following description and drawings.

DETAILED DESCRIPTION

Methods and systems for use in extraction of features from data are disclosed herein. More specifically, the methods and systems described herein may be used for automatic and semi-automatic geographic and geometric feature extraction.

Figure 1:
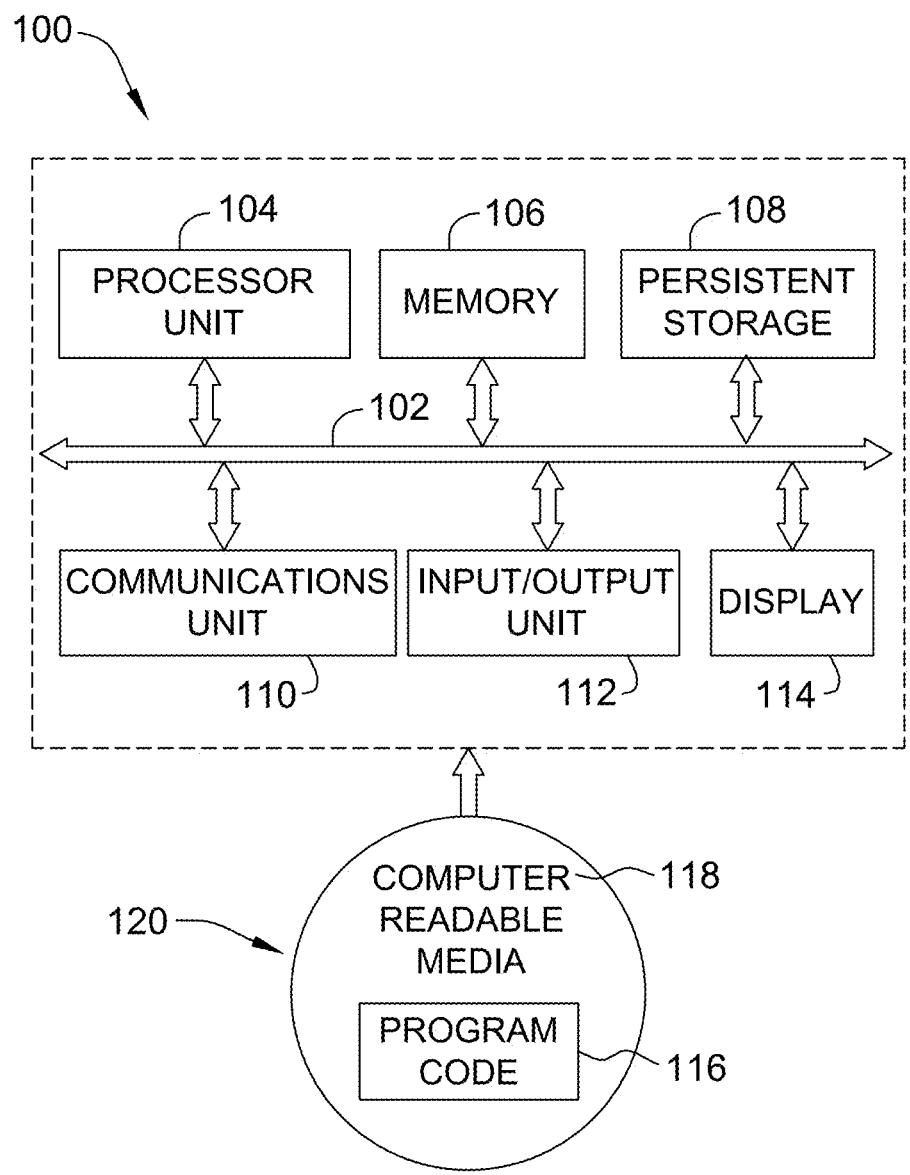
FIG. 1 is a block diagram of an exemplary computing device.

Exemplary implementations are performed using computing devices. FIG. 1 is a block diagram of an exemplary computing device 100 that may be used. In the exemplary implementation, computing device 100 includes communications fabric 102 that provides communications between a processor unit 104, a memory 106, persistent storage 108, a communications unit 110, an input/output (I/O) unit 112, and a presentation interface, such as a display 114. In addition to, or in alternative to, the presentation interface may include an audio device (not shown) and/or any device capable of conveying information to a user.

Processor unit 104 executes instructions for software that may be loaded into a storage device (e.g., memory 106). Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another implementation, processor unit 104 may be a homogeneous processor system containing multiple processors of the same type.

Memory 106 and persistent storage 108 are examples of storage devices. As used herein, a storage device is any tangible piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store (e.g., have embodied thereon) computer-executable instructions, executable software components, network object descriptions and attributes, data flows, threat finding data, network templates, and/or any other information suitable for use with the methods described herein. When executed by a processor (e.g., processor unit 104), such computer-executable instructions and/or components cause the processor to perform one or more of the operations described herein.

Communications unit 110, in these examples, provides for communications with other computing devices or systems. In the exemplary implementation, communications unit 110 is a network interface card. Communications unit 110 may provide communications through the use of either or both physical and wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information, such as any information described herein, to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different implementations may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different implementations may be embodied in a non-transitory form on different physical or tangible computer-readable media, such as memory 106 or persistent storage 108.

Program code 116 is located in a functional form on non-transitory computer-readable media 118 that is selectively removable and may be loaded onto or transferred to computing device 100 for execution by processor unit 104. Program code 116 and computer-readable media 118 form computer program product 120 in these examples. In one example, computer-readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer-readable media 118 also may take the form of a persistent storage, such as a hard drive, a thumb drive, or a flash memory that is connected to computing device 100. The tangible form of computer-readable media 118 is also referred to as computer recordable storage media. In some instances, computer-readable media 118 may not be removable.

Alternatively, program code 116 may be transferred to computing device 100 from computer-readable media 118 through a communications link to communications unit 110 and/or through a connection to input/output unit 112. The communications link and/or the connection may be physical or wireless in the illustrative examples. The computer-readable media also may take the form of non-tangible media, such as communications links or wireless transmissions containing the program code.

In some illustrative implementations, program code 116 may be downloaded over a network to persistent storage 108 from another computing device or computer system for use within computing device 100. For instance, program code stored in a computer-readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include one or more part agents, ordering manager agents, supplier agents, and/or any component suitable for practicing the methods described herein. Each component may include computer-executable instructions that, when executed by processor unit 104, cause processor unit 104 to perform one or more of the operations described herein.

The different components illustrated herein for computing device 100 are not meant to provide architectural limitations to the manner in which different implementations may be implemented. The different illustrative implementations may be implemented in a computer system including components in addition to or in place of those illustrated for computing device 100. For example, other components shown in FIG. 1 can be varied from the illustrative examples shown.

As one example, a storage device in computing device 100 is any hardware apparatus that may store data. Memory 106, persistent storage 108 and computer-readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
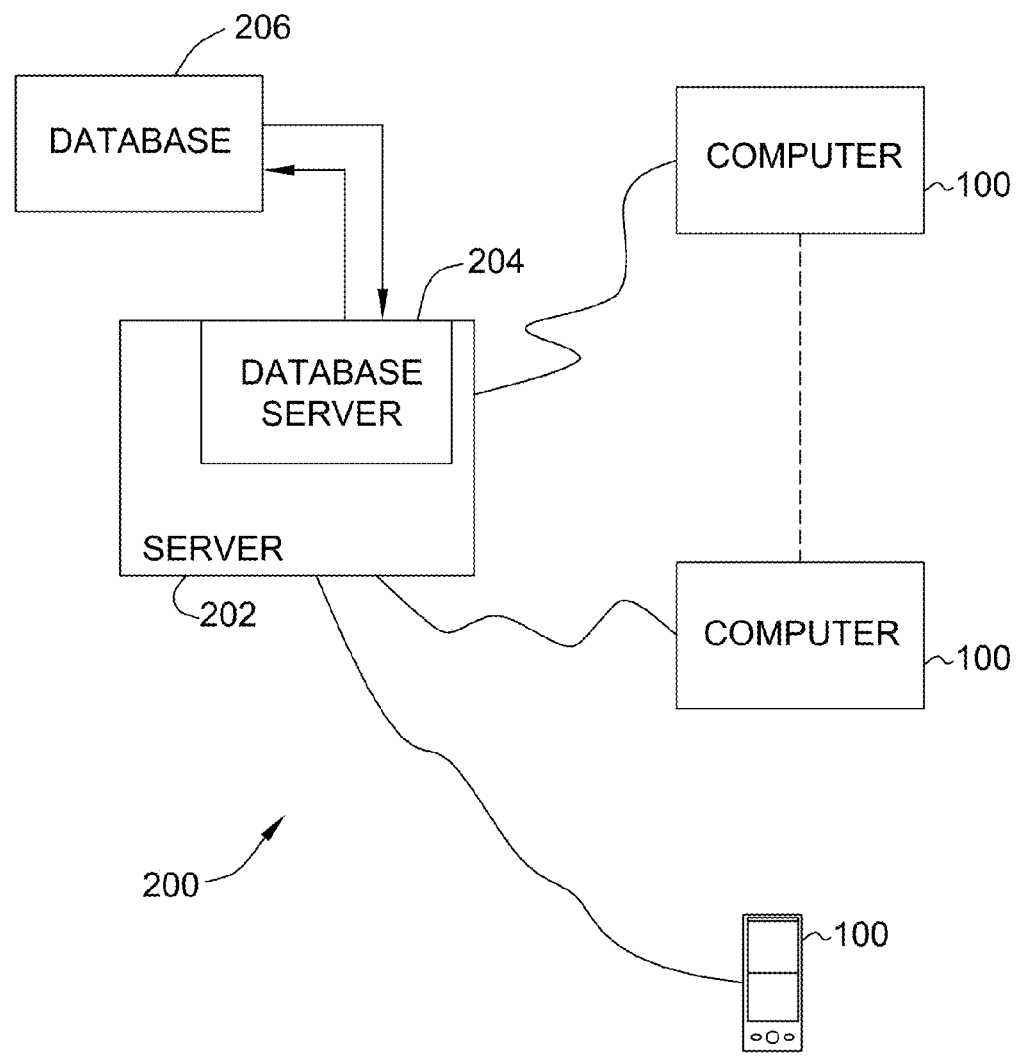
FIG. 2 is a block diagram of an exemplary network including the computing device shown in FIG. 1.

Some exemplary implementations are implemented using a network of computing devices. FIG. 2 is a simplified block diagram of an exemplary network 200 of computing devices 100.

More specifically, in the example implementation, system 200 includes a server system 202, which is a type of computer system, and a plurality of computing devices 100 connected to server system 202. In one implementation, server system 202 is accessible to computing devices 100 using the Internet. In other implementations, server system 202 may be accessible using any other suitable communication network, including, for example, a wide area network (WAN), a local area network (LAN), etc. Computing devices 100 may be interconnected to the Internet through many interfaces including a network, such as a local area network (LAN) or a wide area network (WAN), dial-in-connections, cable modems, and special high-speed ISDN lines. Computing devices 100 may be any device capable of interconnecting to the Internet including a web-based phone, personal digital assistant (PDA), or other web-based connectable equipment.

A database server 204 is connected to database 206, which may contain information on a variety of matters, including sensor data as described below in greater detail. In one implementation, centralized database 206 is stored on server system 202 and can be accessed by logging onto server system 202 through one of computing devices 100. In an alternative implementation, database 206 is stored remotely from server system 202 and may be non-centralized. Moreover, in some embodiments, database 206 and database server 204 utilize role-based authentication.

Figure 3:
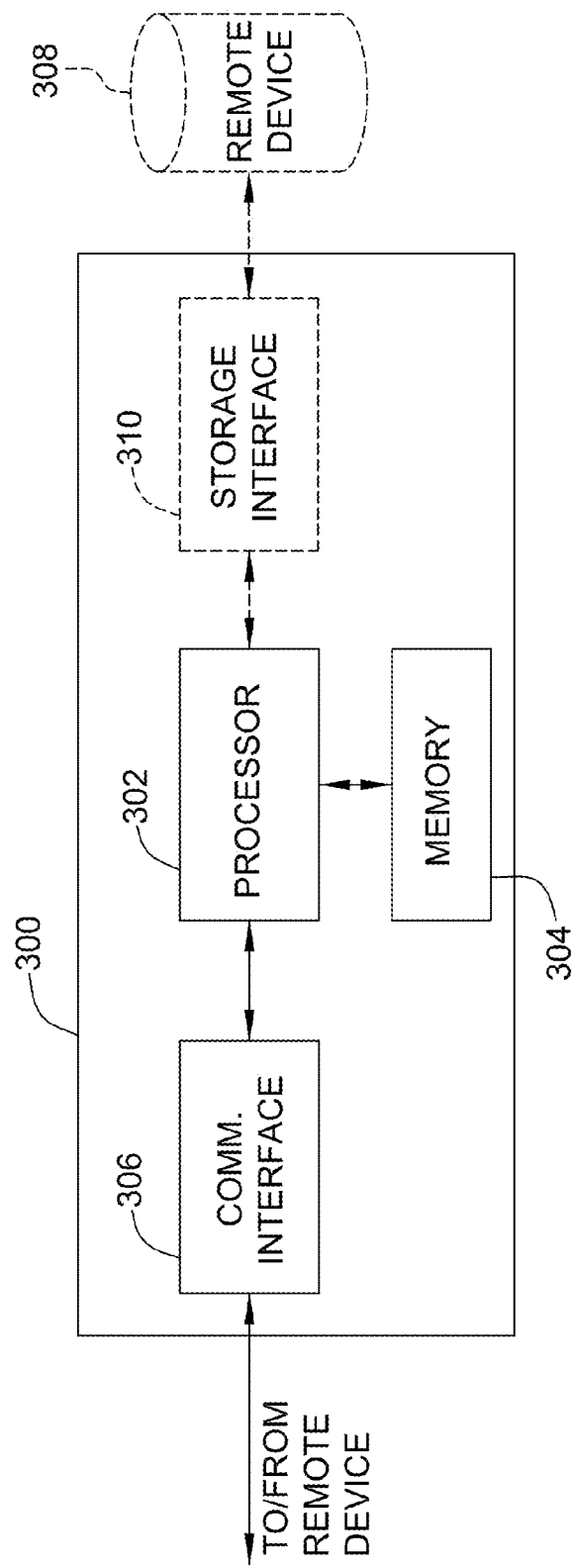
FIG. 3 is an exemplary configuration of a server computer device for use in the network shown in FIG. 2.

FIG. 3 illustrates an exemplary configuration of a server computer device 300 such as server system 202 (shown in FIG. 2). Server computer device 300 may include, but is not limited to, database server 204. Server computer device 300 includes a processor 302 for executing instructions. Instructions may be stored in a memory area 304, for example. Processor 302 may include one or more processing units (e.g., in a multi-core configuration). Memory area 304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Processor 302 is operatively coupled to a communication interface 306 such that server computer device 300 is capable of communicating with a remote device such as computing device 100 or another server computer device 300. For example, communication interface 306 may receive requests from computing devices 100 via the Internet.

Processor 302 may also be operatively coupled to a storage device 308. Storage device 308 is any computer-operated hardware suitable for storing and/or retrieving data. In some implementations, storage device 308 is integrated in server computer device 300. For example, server computer device 300 may include one or more hard disk drives as storage device 308. In other implementations, storage device 308 is external to server computer device 300 and may be accessed by a plurality of server computer devices 300. For example, storage device 308 may include multiple storage units such as hard disks or solid state disks in a redundant array of inexpensive disks (RAID) configuration. Storage device 308 may include a storage area network (SAN) and/or a network attached storage (NAS) system.

In some implementations, processor 300 is operatively coupled to storage device 308 via a storage interface 310. Storage interface 310 is any component capable of providing processor 300 with access to storage device 308. Storage interface 310 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 300 with access to storage device 308.

An example system for facilitating detecting features in sensor data will now be described with additional reference to FIGS. 4-8. The system is implemented using computing device 100. The system includes display device 114, a memory device for storing sensor data, and processor 104 communicatively coupled to the memory device. In some implementations, the memory device is persistent storage 108. In other implementations, the memory device is memory device 304 or 308. The sensor data may be any suitable sensor data including, for example, raw input from a sensor such as red/green/blue (RGB) imagery, multispectral imagery, hyperspectral imagery, light detection and ranging (LiDAR) data, and/or radar data. The sensor data may include derived information such as, for example, an entropy image, Canny edge detection, spectral indices, or other derived information. In addition, the sensor data may include color space transformations, such as a movement from RGB to the CEILAB color space.

Figure 4:
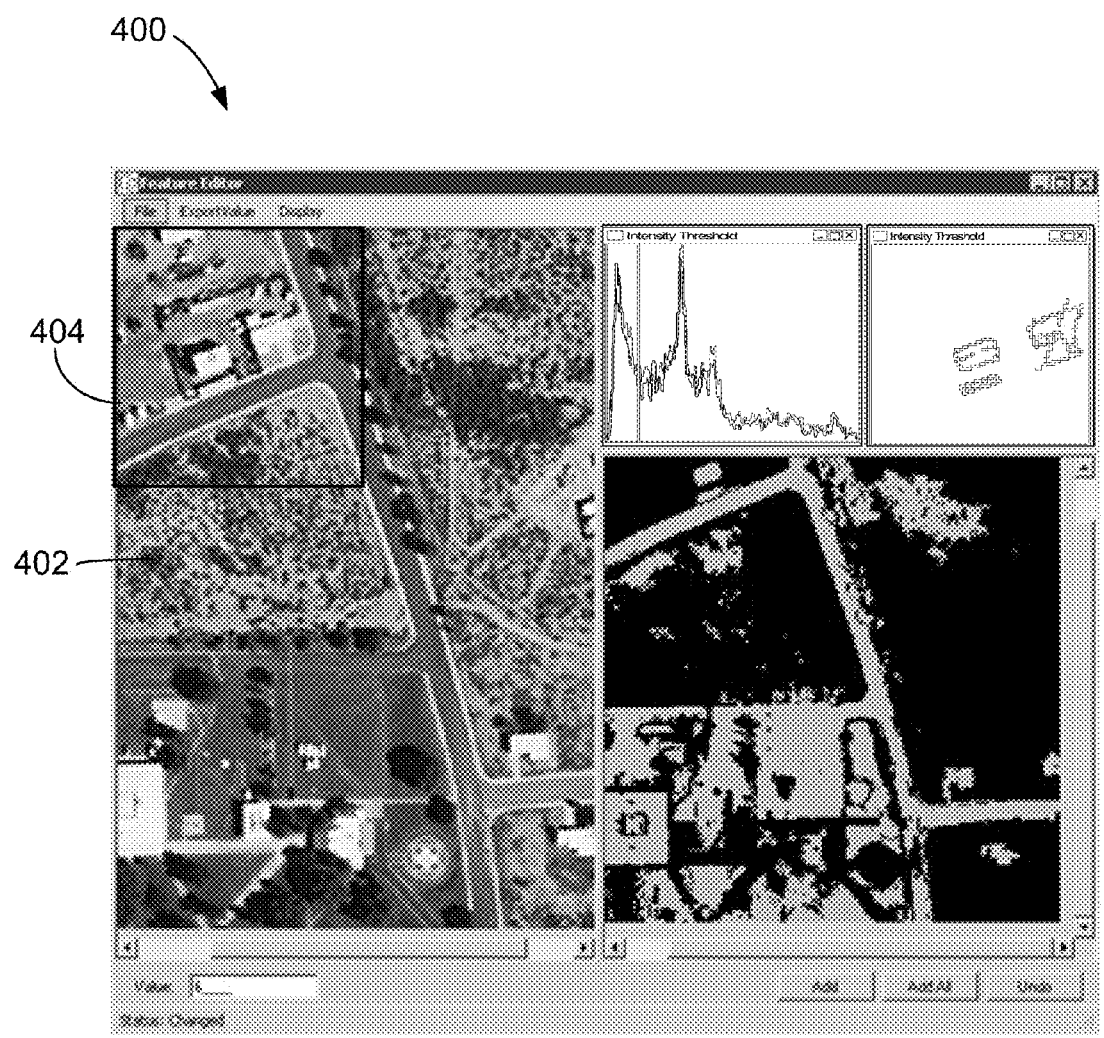
FIG. 4 is an illustration of an exemplary user interface displayed by the computing device shown in FIG. 1.
Figure 5:
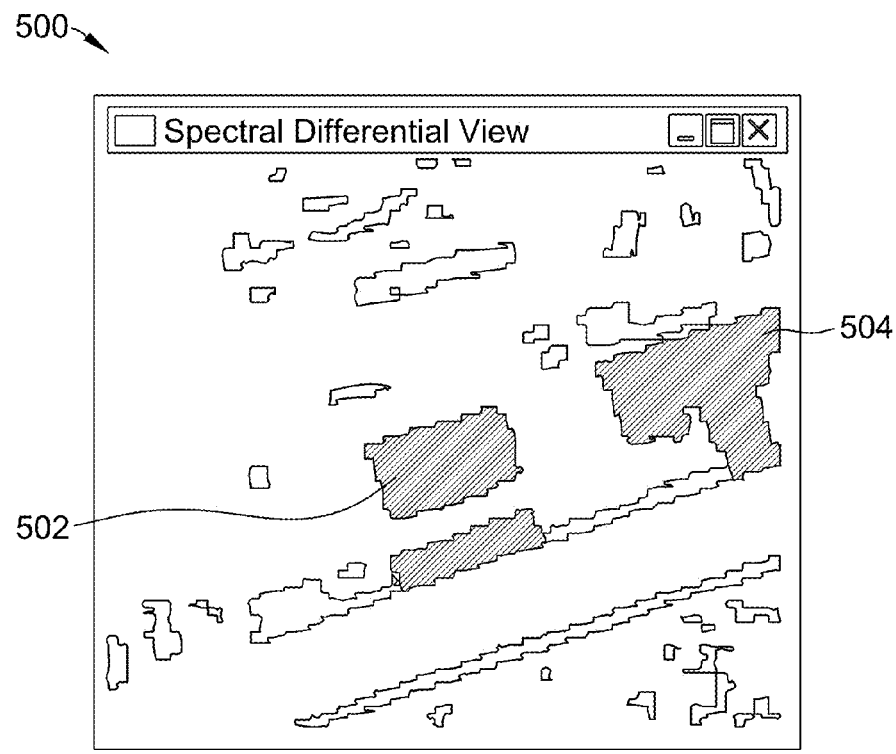
FIG. 5 is an illustration of a sub-region display with enhanced contrast.

Processor 104 is configured, such as by executable code stored in persistent storage 108, to receive a first set of sensor data about a geographical region, and generate a second set of sensor data. The first set of sensor data includes data in a plurality of bands. For example, RGB sensor data includes data in three bands, i.e., a red band, a green band, and a blue band. The first set of sensor data may include data in any suitable number of bands. Processor 104 displays, on display device 114, a visual image defined by the first set of sensor data. FIG. 4 is an exemplary user interface 400 displayed by processor 104 on display device 114. In this implementation, the sensor data is RGB imagery associated with a geographical region displayed in window 402. The image displayed in window 402 includes all three bands of data in the first set of sensor data.

Processor 104 is configured to generate the second set of sensor data by receiving a first input designating a first sub-region of the geographical region, and determining a single band representation of at least a portion of the first set of sensor data associated with the first sub-region. Thus, when a user selects sub-region 404, processor 104 determines a single band representation of the three band sensor data associated with sub-region 404 and displays an image 500 (shown in FIG. 5) of the updated data on display device 114. For example, processor 104 reduces the three bands of data in RGB image data to a single band greyscale image in which each pixel has a single value representing intensity between black and white. Projecting the multi-band sensor data to a single band facilitates increasing the contrast of the sensor data to permit separate objects to be located in the sensor data.

In the exemplary implementation, processor 104 uses a sensor differential method (SDM) to determine the single band representation. In general, SDM is a weighted metric or norm based on the sensor data of interest (e.g., the sensor data associated with the first sub-region 404). More particularly, the user selects a particular data element (e.g., a particular pixel), in the first sub-region 404 as a selected data element. In other implementations, more than one point may be selected by the user as selected points. For each data element associated with first sub-region 404, processor 104 determines a distance between an initial value of the data element and the selected data element in each band. As used herein, the distance between two data elements is a difference between the values of the two data elements. For example, in the case of RGB, the selected pixel value may be (255, 81, 4) and the comparing initial pixel value is (255, 78, 0). In this case, the distance in the exemplary implementation is [(255−255)^2+(81−78)^2+(4−0)^2]0.5, which simplifies to [25]^0.5, or 5. Thus, in the exemplary implementation, the difference is determined by taking the square root of the sum, over each band, of the squares of the difference of the selected data element band value and the initial value of the band value. In other implementations, any other suitable metric for determining the distances may be utilized, or in other words the distance determination can apply to any norm, or metric, of the pixels.

For each data element, the determined difference in each band is modified by (e.g., multiplied by) a weighting factor for that band. The weighting factor for each band is determined and selected by the user. In other implementations, the weighting factor for each band is a predetermined value of the system. After the weighting factors are applied to the determined differences for a particular data element in each band, the weighted differences for that data element are summed and the summed value is assigned as a new value for the data element. The selected data element has a distance (in terms of the element's value) of zero from itself in all bands and is assigned a value of zero. Each other data element that has the same initial value as the selected data element will also be assigned a value of zero. All other data elements associated with the first sub-region 404 will be assigned a new value determined as described above. It should be noted that not all bands of the first set of sensor data necessarily affect the new value for data elements. For example, a user may set the weighting factor for one or more bands to zero, thereby limiting the bands that affect the new value to those bands that have a nonzero weighting factor.

The SDM metric described above produces increased contrast in the sensor data associated with the first sub-region 404. Thus, for example, in FIG. 5, a first building 502 and a second building 504 are more clearly visible. Moreover, although described above in connection with reducing multi-band sensor data to a single band, the SDM metric may also be applied to single band sensor data to increase contrast.

Figure 6:
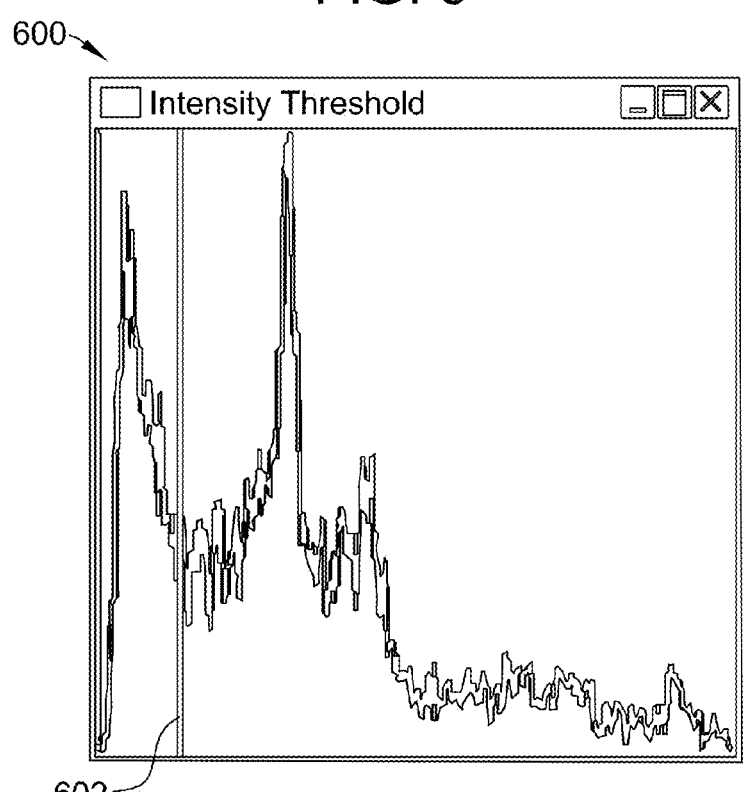
FIG. 6 is an illustration of an exemplary histogram for the sub-region shown in FIG. 5 and including a selectable threshold.

As shown in FIG. 6, in the exemplary implementation, processor 104 displays a selectable histogram 600 to the user. Histogram 600 represents a graph of the quantity of data elements, or pixels, having a particular SDM value, where the x-axis is the SDM value ranging from minimum SDM value, or 0, to the maximum SDM value. In the exemplary implementation of histogram 600, the minimum to maximum SDM values represent black to white. The user selects a threshold, indicated by threshold 602, on histogram 600. The system displays the SDM processed sensor data associated with the first sub-region 404 with the threshold selected by the user applied. As used herein, a threshold is a set or determined value for dividing data into two groups, with one group having values above the threshold and the second group having values at or below the threshold. Different actions are taken with respect to data having a value above the threshold and data having a value at or below the threshold. In particular, all data elements with a value greater than the threshold are set to a same value, and all data elements with a value less than the threshold are set to a value different from the value of the data elements that are greater than the threshold value. In the exemplary implementation, the data elements that are greater than the threshold are assigned a value represented by a black pixel and the data elements below the threshold are assigned a value represented by a non-black (e.g., white) pixel. In other implementations, the data elements above the threshold are set to any other suitable value, including for example, a value represented by a white pixel. The user may vary the threshold as desired to obtain the desired contrast. In other implementations, the threshold parameter is determined by processor 104 using any suitable technique. For example, in some implementations, Otsu's method is used by processor 104 to perform histogram shape-based image thresholding. In some implementations, additional functions may be used in connection with the thresholding described above. For example, in some implementations, a user may select to apply a morphological function when thresholding occurs. The morphological function may include, for example, a dilate/erode function, an erode/dilate function, or any other morphological function suitable for improving shape and/or object identification. In some implementations, hysteresis may be applied to the thresholding. Hysteresis is typically set as a percentage of the threshold by the user. The use of hysteresis permits a limited sliding scale to be applied to the threshold in order to blend values together.

Figure 7:
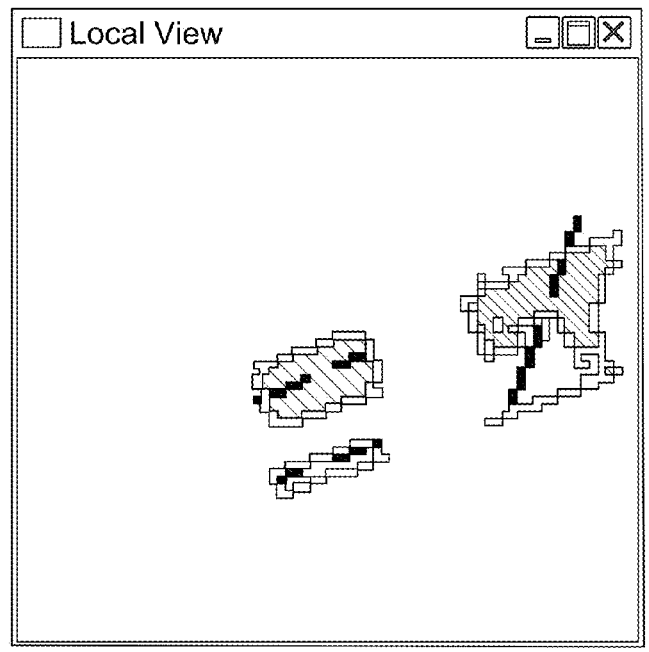
FIG. 7 is an illustration of a display of the sub-region shown in FIG. 5 after labeling.

The system segments the thresholded second set of sensor data into connected elements producing a representation of the second set of sensor data as shown in FIG. 7. In the exemplary implementation, a union find algorithm is used to identify the connected elements in the second set of sensor data. In other implementations, any other algorithm suitable for identifying connected elements in sensor data may be utilized.

After the second set of sensor data has been segmented into connected objects as described above, features in the sensor data may be identified and extracted. In the exemplary implementation discussed herein, the features to be identified are buildings. In other implementations, any other features present in the sensor data may be subjected to the SDM and feature identification and extraction. In some instances, further feature extraction may not be desired. For example, if the user is interested in locating water features (e.g., lakes, rivers, canals, etc.) in the sensor data, the SDM metric and thresholding described above may reduce the first set of sensor data such that the only remaining objects are all water features and further processing, as described below for example, may not be needed.

Figure 8:
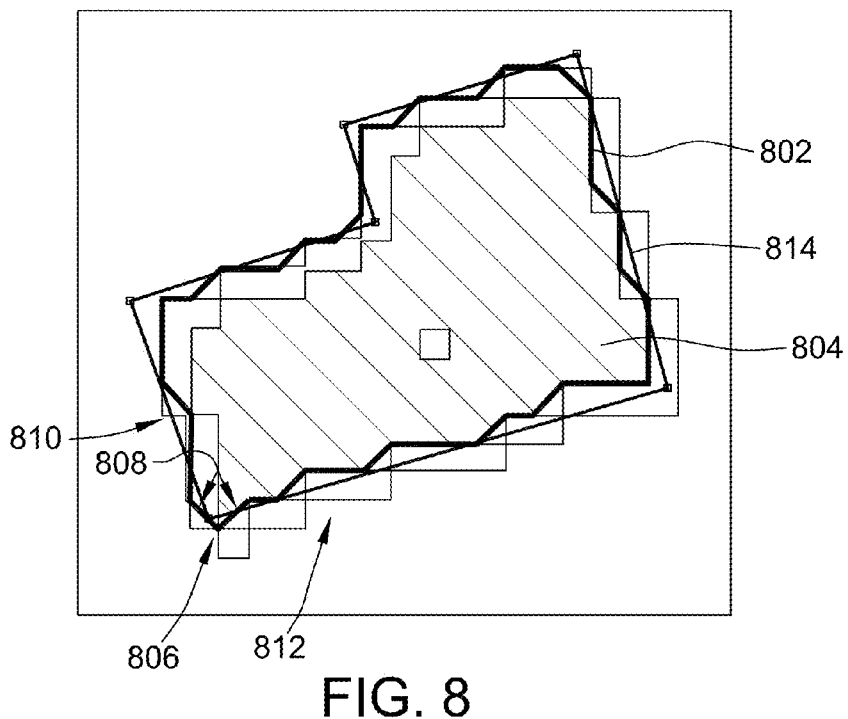
FIG. 8 is an illustration of a display of another object after labeling and reduction.

During manual building identification and extraction, a user selects the labeled objects that the user believes to be building. As will be described in more detail below, the user may select to have the system attempt to reduce, or simplify, the sensor data for the selected building to produce, for example, a smoother, more accurate representation of the building. The reduction process will be described with reference to FIG. 8. FIG. 8 is an example of an object 800 labeled as described above. In this example, the object 800 is a building that has been selected by the user. Object 800 includes a label 804, determined as described above. A curve 802 surrounds label 804. Because of the cellular nature of the sensor data, the curve 802 is very jagged. The reduction process attempts to simplify the jagged curve 802 to a reduced boundary 814, made of mostly straight line sections, that more closely resembles the building represented by object 800.

The system includes a reduction energy function utilized to reduce the jagged curve 802. The energy function is a function programmed with a set of rules for determining which of two or more objects is better. For example, the energy function for buildings may value straight lines above jagged or curved lines, common building angles, such as ninety degrees, may be preferred over other angles, etc. Any suitable rules may be used. The system includes a plurality of reductions that may be applied to labeled objects. These reductions are techniques for simplifying the labeled object. Example reductions include a best bounding box reduction that simply draws a rectangular shape around a labeled object, a point perturbing reduction, angle sharpening reductions, various straightening reductions, etc. The system also includes reductions to push sides to the outer boundary of object 800, to push angles near the standard angles (e.g., near 90 degrees) to those angles, and to ignore voids within object 800. The user can select one or more of the reductions to be applied to the selected object. In the exemplary implementation, groups of one or more reductions, referred to herein as configurations, are created by creating scripts identifying the reductions and the order in which the reductions are to be performed. In other implementations, any other suitable method of selecting reductions may be used.

When a user selects a configuration of reductions to apply to a selected building, e.g. object 800, the energy function compares the object before and after each reduction. For each reduction in the configuration, the energy function determines whether the object 800 as reduced by the particular reduction is better than the object 800 before that reduction. If the original object 800 is better, the original object is retained and the next reduction in the configuration is performed on the original object 800. If the reduced object 800 is better, the reduced object 800 is retained and the next reduction in the configuration is performed on the reduced object 800. This process of reduction and comparison continues until all reductions in the configuration have been tried. The object as reduced by the various reductions in the configuration, as selected by the energy function, is displayed to the user. Thus the user decides which configuration(s) to try, and which results to keep. Thus, the user may select to perform different reduction configurations until the user is satisfied with the reduction.

In the exemplary implementation, the system is also configured to perform automated building extraction. Other implementations include only manual identification or only automated identification. In the exemplary implementation discussed herein, the features to be automatically identified are buildings. In other implementations, any other features present in the sensor data may be subjected to the automated feature identification and extraction.

The automated building identification process begins with the first set of sensor data. Rather than applying the SDM metric to a portion of the first set of sensor data as described above, the automated process is applied to the entire first set of sensor data. In other implementations, the automated process may be applied to less than all of the first set of sensor data. In the automated process, the first set of sensor data is thresholded according to a threshold selected, e.g., on a histogram, in the same manner as in the manual process.

In the exemplary implementation, an average image technique is utilized to identify connected components in the first set of sensor data. Although described herein with reference to color, the process may be used with any number of bands and any type of sensor data within that band. The average image technique produces an image with a significantly reduced color representation (i.e., the number of colors that make up the image), while preserving boundaries of objects and preserving natural average color for a region.

The average image technique performed by the system combines a union-find algorithm for determining connected components in a monochromatic image with additional information to track color and average color. During the average image technique, processor 104 examines each data element, e.g., each pixel, in a predetermined order, such as from left to right in each row. The value of each data element is compared to its neighbors to determine whether or not the data element is connected to one or more of its neighbors. An initial threshold is used to determine whether or not two data elements are connected. The result after a first pass of the data is clusters of connected data elements. Each of these clusters has a center of mass, also referred to herein as an average. The average changes as the cluster grows. Data elements on the edges of a cluster, which initially were determined to be part of the cluster, may differ from the cluster's average by more than the initial threshold. During subsequent passes, a second threshold is applied to determine whether or not data elements are connected. The second threshold is a percentage of the initial threshold. Each data element that has a value closer to the average of its cluster than second threshold is determined to be part of the cluster and assigned a value equal to the average. Data elements that are not within the second threshold distance from the average are reset to their original value. In the exemplary implementation, the second threshold increases during each pass through the sensor data. The average image technique is applied to the sensor data for a predefined number of passes. In the last pass through the sensor data, the threshold is one hundred percent of the original threshold. In other embodiments, any other suitable threshold may be used for the last, or any other, pass. After all passes through the sensor data are completed, each cluster of connected data elements are labeled as a connected object.

The automated process utilizes reductions and the energy function described above with reference to the manual identification process. In the automated process, the system selects all of the connected objects as potential buildings. A predetermined set of reductions is applied to each object, e.g. object 800, under the guidance of the energy function. The reductions preserve the boundary as well as the corners of the object 800. Reductions for non-corner regions are permitted. Corners, e.g., corner 806, are determined by computing a turn angle, e.g. angle 808, between adjacent non-corner regions, e.g. regions 810 and 812. The automatically reduced object 800, although not necessarily the same or as accurate as a reduction assisted by the user in a manual identification, is a simplified object having generally smooth straight line segments separated by corners having turn angles that substantially match the original turn angles of the object.

Following reduction of the connected objects, the system attempts to identify which, if any, of the connected objects are buildings. In the exemplary implementation, automated building identification is based on the assumption that a building is typically an object with a majority of straight lines that are separated by approximately 90 degree angles. Occasionally a building includes straight lines separated by 30, 45, and/or 60 degree angles. The system examines each reduced object to determine whether the object is largely straight line segments separated by a predetermined angle, such as 90 degrees. In some implementations, multiple predetermined angles are used, such as 30, 45, 60, and/or 90 degrees. With reference again to object 800 in FIG. 8, the system determines a total boundary length of the reduced boundary 814. Each corner that has an angle value substantially the same as the predetermined angle is located. The lengths of the straight line segments adjacent each of these corners are summed together. This results in a total length of all straight segments that are separated by the predetermined angle. In the exemplary implementation, the predetermined angle value is 90 degrees. In other implementations, the predetermined angle value may include any suitable angle value, including more than one angle value. Straight line segments that are not adjacent to a turn angle of the predetermined angle value are not included in the total length calculation.

To determine whether or not the object 800 is largely straight line segments separated by the predetermined angle (and, therefore, probably a building), the system compares the calculated total length to the total boundary length of the reduced boundary 814. More specifically, the system calculates a ratio, or percentage, of the calculated total length to total boundary length. The percentage is compared to a predetermined threshold value. In the exemplary implementation the threshold value is 75%. In other implementations any other suitable threshold may be used. If the percentage equals or exceeds the threshold value, object 800 is likely a building and the system performs an additional comparison. The area of object 800 is calculated and compared to an area threshold. The area threshold is selected to limit the likelihood of the system identifying as a building rectangular objects that are actually too small to be a building. If the calculated area of object 800 exceeds the area threshold, the system identifies object 800 as a building. The area threshold may be a preset area threshold in the system or may be set by a user of the system. Objects with ratios that do not exceed the threshold value and/or with calculated areas that do not exceed the area threshold are not labeled as buildings by the system.

In the exemplary implementation, the system is additionally configured to automatically identify some features in the sensor data based on spectral characteristics of the sensor data. Some objects, may be identified based on direct spectral characteristics while others are detected by comparing two wavelengths of the spectrum. For example, the system is configured to detect vegetation in the sensor data by utilizing multiple indices in a probabilistic manner. In the case of RGB sensor data, the system computes a vegetation index comparing the green and blue bands to produce an index without infrared. The system also determines the Normalized Difference Vegetation Index (NDVI), which includes the near-infrared band, for the sensor data. Each index technique uses mathematical operations to produce, for each data element, a number that is assigned to that data element (e.g., for each pixel in an image). The relative values assigned to the data elements convey some information about the data element (with what the particular information is depending on the technique used). For example, the NDVI is calculated by taking the difference between an element's value in the red band and the infrared band and dividing the difference by the sum of the red and infrared values. The resulting value will be between −1.0 and +1.0. Vegetation will tend to produce relatively high positive NDVI values (e.g., between 0.3 and 0.8), while white clouds produce negative NDVI values, freestanding water produces NDVI values around zero, and soil results in NDVI values slightly above zero (but lower than vegetation). NDVI and the RGB-based index are normalized so that they are on the same numerical scale and treated as independent events that may be combined as probabilities, for example by multiplying the indices. Thus, each index is treated as an independent probability that a data element represents vegetation. The system combines the two indices to produce a third index, sometimes referred to as an enhanced index, which is used to determine whether or not a pixel of the sensor data is likely to represent vegetation. In some implementations, the system identifies features, such as vegetation and/or shadows, based on simple index computations for NDVI, differential indices based on other band combination, basic shadow indices, enhanced shadow indices, and enhanced vegetation indices.

After sensor data has been processed by the system as described herein, a second set of sensor data including the identified features, e.g., buildings, vegetation, etc. is available for any suitable use. In some embodiments, the data is used for orthorectification, material classification, and/or three dimensional (3D) model generation and/or simulation. Moreover, in some implementations, the system and methods described herein are integrated into another end-use system, such as a 3D simulation system.

Exemplary technical effects of the methods, systems, and apparatus described herein include at least one of (a) receiving by a computing device, a first set of multi-band sensor data about a geographical region; (b) generating, by the computing device, a second set of sensor data; (c) receiving, by the computing device, a first input designating a first sub-region of the geographical region; and (d) determining, by the computing device, a single band representation of at least a portion of the first set of sensor data associated with the first sub-region.

The methods and systems of the present disclosure provide an efficient method for user-interactive extraction of buildings, roads, waterways, etc. and automatic feature identification for buildings. The extraction of data is from imagery, sensors, and/or terrain data. Various implementations provide significant cost savings by increasing the speed at which buildings are identified and the speed at which boundaries of buildings are produced.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for facilitating detecting features in sensor data, the method being implemented by a computing device, the method comprising:

receiving, by the computing device, a first set of sensor data about a geographical region, the first set of sensor data comprising data in a plurality of bands; and generating, by the computing device, a second set of sensor data by:

receiving, by the computing device, a first input designating a first sub-region of the geographical region;

determining, by the computing device, a single band representation of at least a portion of the first set of sensor data associated with the first sub-region;

labeling objects defining substantially closed polygons in at least a portion of the first set of sensor data associated with the first sub-region;

reducing non-corner portions of the labeled objects to straight line segments;

computing a turn angle between adjacent straight line segments determining, for each labeled object, a total boundary length of said labeled object;

determining, for each labeled object, a total length of straight line segments separated by a turn angle having a value substantially equal to at least a predetermined first angle value;

determining, for each labeled object, a boundary ratio of the total length of straight line segments separated by a turn angle substantially equal to the first angle value to the total boundary length of said labeled object; and identifying as buildings the labeled objects for which the boundary ratio exceeds a threshold value.

2. A method in accordance with claim 1, wherein said receiving a first input designating a first sub-region further comprises receiving, by the computing device, a designation of at least a selected data element of the first set of sensor data associated with the first sub-region, and wherein said determining a single band representation is based, at least in part, on a value of the selected data element in at least one band of the plurality of bands.

3. A method in accordance with claim 2, wherein said determining a single band representation comprises determining a value for each data element associated with the first sub-region as a function of the difference between an initial value for each said data element and the value of the selected data element in the at least one band of the plurality of bands, and assigning the determined value to that data element.

4. A method in accordance with claim 3, wherein determining a single band representation based on a value of the selected data element in at least one band of the plurality of bands comprises determining a single band representation based on the value of the selected data element in each band of the plurality of bands and a weight assigned to each band of the plurality of bands.

5. A method in accordance with claim 3, wherein determining a value for each data element associated with the first sub-region as a function of the difference between an initial value for each said data element and the value of the selected data element in the at least one band of the plurality of bands comprises determining a value for each data element associated with the first sub-region using a weighted norm metric.

6. A method in accordance with claim 1, wherein generating a second set of sensor data further comprises
displaying, in a user interface, a histogram of the single band representation of the portion of the first set of sensor data associated with the first sub-region;
receiving, by the computing device, an input designating a threshold level based on the histogram; and
filtering the second set of sensor data using the designated threshold level.

7. A method in accordance with claim 1, further comprising identifying vegetation associated with the first set of sensor data based on at least one spectral characteristic of the first set of sensor data by:
generating a first index based on at least a first spectral characteristic of the first set of sensor data;
generating a second index based on at least a second spectral characteristic of the first set of sensor data; and
identifying vegetation associated with the first set of sensor data as a function of the first index and the second index.

8. A method in accordance with claim 7, wherein identifying vegetation associated with the first set of sensor data as a function of the first index and the second index comprises generating a third index as a function of the first index and the second index, and identifying vegetation associated with the first set of sensor data based on the third index.

9. A computing device for facilitating detecting features in sensor data, the computing device comprising a processor and a memory coupled to said processor, wherein said memory comprises computer-executable instructions that, when executed by said processor, cause said computing device to:
receive a first set of sensor data about a geographical region, the first set of sensor data comprising data in a plurality of bands;
generate a second set of sensor data by:
receiving a first input designating a first sub-region of the geographical region; and
determining a single band representation of at least a portion of the first set of sensor data associated with the first sub-region;
label objects defining substantially closed polygons in at least a portion of the first set of sensor data associated with the first sub-region;
reduce non-corner portions of the labeled objects to straight line segments; and
compute a turn angle between adjacent straight line segments
determine, for each labeled object, a total boundary length of said labeled object;
determine, for each labeled object, a total length of straight line segments separated by a turn angle having value substantially equal to at least a predetermined first angle value;
determine, for each labeled object, a boundary ratio of the total length of straight line segments separated by a turn angle substantially equal to the first angle value to the total boundary length of said labeled object; and
identify as buildings the labeled objects for which the boundary ratio exceeds a threshold value.

10. A computing device in accordance with claim 9, wherein receiving a first input designating a first sub-region further comprises receiving a designation of at least a selected data element of the first set of sensor data associated with the first sub-region, and wherein determining a single band representation is based, at least in part, on a value of the selected data element in at least one band of the plurality of bands.

11. A computing device in accordance with claim 10, wherein determining a single band representation comprises determining a value for each data element associated with the first sub-region as a function of a weight assigned to each band of the plurality of bands and the difference between an initial value for each said data element in each band of the plurality of bands and the value of the selected data element in each corresponding band of the plurality of bands.

12. A non-transitory computer-readable storage device having computer-executable instructions embodied thereon, wherein when executed by a computing device comprising a processor and a memory coupled to the processor, said computer-executable instructions cause the computing device to:
receive a first set of sensor data about a geographical region, the first set of sensor data comprising data in a plurality of bands;
generate a second set of sensor data by:
receiving a first input designating a first sub-region of the geographical region; and
determining a single band representation of at least a portion of the first set of sensor data associated with the first sub-region;
label objects defining substantially closed polygons in at least a portion of the first set of sensor data associated with the first sub-region;
reduce non-corner portions of the labeled objects to straight line segments;
compute a turn angle between adjacent straight line segments
determine, for each labeled object, a total boundary length of said labeled object;
determine, for each labeled object, a total length of straight line segments separated by a turn angle having value substantially equal to at least a predetermined first angle value;
determine, for each labeled object, a boundary ratio of the total length of straight line segments separated by a turn angle substantially equal to the first angle value to the total boundary length of said labeled object; and
identify as buildings the labeled objects for which the boundary ratio exceeds a threshold value.

13. A non-transitory computer-readable storage device in accordance with claim 12, wherein receiving a first input designating a first sub-region further comprises receiving a designation of at least a selected data element of the first set of sensor data associated with the first sub-region, and wherein said computer-executable instructions cause said computing device to determine a single band representation based, at least in part, on a value of the selected data element in at least one band of the plurality of bands.

14. A non-transitory computer-readable storage device in accordance with claim 13, wherein said computer-executable instructions cause said computing device to determine a single band representation by determining a value for each data element associated with the first sub-region as a function of a weight assigned to each band of the plurality of bands and the difference between an initial value for each said data element in each band of the plurality of bands and the value of the selected data element in each corresponding band of the plurality of bands.

* * * * *